(12) United States Patent
Park et al.

(10) Patent No.: US 11,169,866 B2
(45) Date of Patent: Nov. 9, 2021

(54) METHOD FOR DETECTING MEMORY LEAK AND ELECTRONIC DEVICE THEREOF

(71) Applicant: SAMSUNG ELECTRONICS CO., LTD., Suwon-si (KR)

(72) Inventors: Sangjun Park, Suwon-si (KR); Sungdo Moon, Suwon-si (KR); Mooyoung Kim, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 56 days.

(21) Appl. No.: 16/526,229

(22) Filed: Jul. 30, 2019

(65) Prior Publication Data
US 2020/0042371 A1 Feb. 6, 2020

(30) Foreign Application Priority Data

Aug. 2, 2018 (KR) .................. 10-2018-0090208

(51) Int. Cl.
| *G06F 11/00* | (2006.01) |
| *G06F 11/07* | (2006.01) |
| *G06F 11/30* | (2006.01) |
| *G06F 11/36* | (2006.01) |

(52) U.S. Cl.
CPC .......... *G06F 11/073* (2013.01); *G06F 11/008* (2013.01); *G06F 11/079* (2013.01); *G06F 11/0751* (2013.01); *G06F 11/0793* (2013.01); *G06F 11/3037* (2013.01); *G06F 11/3612* (2013.01)

(58) Field of Classification Search
CPC .. G06F 11/073; G06F 11/008; G06F 11/0751; G06F 11/079; G06F 11/0793; G06F 11/3037; G06F 11/3612
See application file for complete search history.

(56) References Cited

U.S. PATENT DOCUMENTS

| 8,881,107 | B2  |         | 11/2014 | Bradley et al. |
| 9,064,048 | B2  | *       | 6/2015  | Macik ................. G06F 11/3612 |
| 9,760,464 | B1  | *       | 9/2017  | Helliwell .............. G06F 11/073 |
| 9,940,068 | B2  | *       | 4/2018  | Schorn .................... G06F 11/00 |
| 10,635,578 | B1 | *       | 4/2020  | Smoilovski ......... G06F 11/3037 |

(Continued)

FOREIGN PATENT DOCUMENTS

KR    10-2008-0075293    8/2008

OTHER PUBLICATIONS

Appendix 1 to the Oct. 2019 Update: Subject Matter Eligibility, pp. 1-41 (Year: 2019).*

*Primary Examiner* — Jonathan D Gibson
(74) *Attorney, Agent, or Firm* — Nixon & Vanderhye P.C.

(57) ABSTRACT

Various embodiments relate to a method for detecting a memory leak and an electronic device thereof, the electronic device including a processor, and a memory operatively connected to the processor, wherein the memory stores instructions which, when executed by the processor, control the electronic device to: acquire usage information for the memory of a process executed by the processor based on a collection period determined based at least partially on a characteristic of the process; identify a change pattern of a usage amount for the memory of the process based on the usage information; and determine whether a memory leak occurs based on the change pattern of the usage amount.

18 Claims, 11 Drawing Sheets

(56) References Cited

U.S. PATENT DOCUMENTS

| | | | | |
|---|---|---|---|---|
| 2007/0255773 A1* | 11/2007 | Simeonov | ............. | G06F 11/366 |
| 2008/0072007 A1* | 3/2008 | Zagatta | ................. | G06F 12/023 |
| | | | | 711/170 |
| 2013/0055034 A1* | 2/2013 | Qiu | ..................... | G06F 11/3466 |
| | | | | 714/47.1 |
| 2013/0132699 A1* | 5/2013 | Vaishampayan | .... | G06F 12/0292 |
| | | | | 711/170 |
| 2014/0189438 A1* | 7/2014 | Arbel | ....................... | G06F 11/36 |
| | | | | 714/47.1 |
| 2015/0378799 A1* | 12/2015 | Liu | ..................... | G06F 11/3636 |
| | | | | 717/127 |
| 2016/0055043 A1* | 2/2016 | Chikabelapur | ....... | G06F 11/079 |
| | | | | 714/37 |
| 2016/0070633 A1* | 3/2016 | Abraham | ................ | G06F 11/34 |
| | | | | 714/47.3 |
| 2016/0092325 A1* | 3/2016 | Bar | .................... | G06F 11/0775 |
| | | | | 714/6.1 |
| 2016/0321130 A1* | 11/2016 | Takamiya | ............ | G06F 12/0253 |
| 2017/0308449 A1* | 10/2017 | Mangione-Tran | .... | G06F 9/5022 |
| 2020/0042371 A1* | 2/2020 | Park | .................... | G06F 11/3409 |
| 2020/0159636 A1* | 5/2020 | Xiao | .................. | G06F 11/3075 |

* cited by examiner

METHOD FOR DETECTING MEMORY LEAK AND ELECTRONIC DEVICE THEREOF

CROSS-REFERENCE TO RELATED APPLICATION

This application is based on and claims priority under 35 U.S.C. 119 to Korean Patent Application No. 10-2018-0090208, filed on Aug. 2, 2018, in the Korean Intellectual Property Office, the disclosure of which is incorporated by reference herein in its entirety.

BACKGROUND

1) Field

The disclosure relates to a method for detecting a memory leak and an electronic device thereof.

2) Description of Related Art

Along with the development of digital technology, electronic devices capable of performing information processing, such as smart phones, notebook computers, personal digital assistants (PDA), etc., are becoming popular. Such electronic devices can provide various functions, such as photo shooting, web search, etc., as well as services, such as voice calls and text messages. To this end, electronic devices may be initially loaded with programs associated with various functions or may receive programs from external electronic devices and install the same. These programs may operate on an operating system of the electronic devices and may be dynamically allocated with necessary memory space for use thereof.

Programs (e.g., processes) running on an operating system may dynamically allocate and use required memory space while running, and may then return the memory space, which is no longer being used, to the system so that other programs can use the returned memory. If the unused memory space is not returned to the system, other programs are unable to use the memory space, so the memory space may be wasted. As described above, a phenomenon in which unused memory space is generated may be referred to as a memory leak. The occurrence of frequent memory leaks reduces the size of available memory space in a system, which may degrade the overall performance of the system.

The above information is presented as background information only to assist with an understanding of the disclosure. No determination has been made, and no assertion is made, as to whether any of the above might be applicable as prior art with regard to the disclosure.

SUMMARY

Various example embodiments of the disclosure provide a method and device for collecting memory usage information of a program executed on an operating system of an electronic device, and for detecting a memory leak based on the collected usage information.

According to various example embodiments, an electronic device may include a processor, and a memory operatively connected to the processor, wherein the memory stores instructions which, when executed by the processor control the electronic device to: acquire usage information of memory by a process executed by the processor based on a collection period determined based at least partially on a characteristic of the process; identify a change pattern of a usage amount of the memory by the process based on the usage information; and determine whether a memory leak occurs based on the change pattern of the usage amount.

According to various example embodiments, a method for detecting a memory leak in an electronic device may include: acquiring usage information of memory by a process based at least partially on a characteristic of the process executed by a processor of the electronic device; identifying a change pattern of a usage amount of the memory by the process based on the usage information; and determining whether a memory leak occurs based on the change pattern of the usage amount.

According to various example embodiments, a memory leak may be detected by collecting memory usage information of a process executed on an operating system of an electronic device and analyzing the collected usage information.

According to various example embodiments, a memory of an electronic device may be more efficiently managed by controlling programs in which memory leaks have occurred.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Hereinafter, various example embodiments will be described with reference to the accompanying drawings. In the disclosure, example embodiments are illustrated in drawings and relevant detailed descriptions are provided, but there is no intention to limit the various embodiments to the specific forms disclosed herein. For example, it will be apparent to those skilled in the art that various modifications and changes may be made to the embodiments without departing from the spirit and scope of the disclosure.

Figure 1:
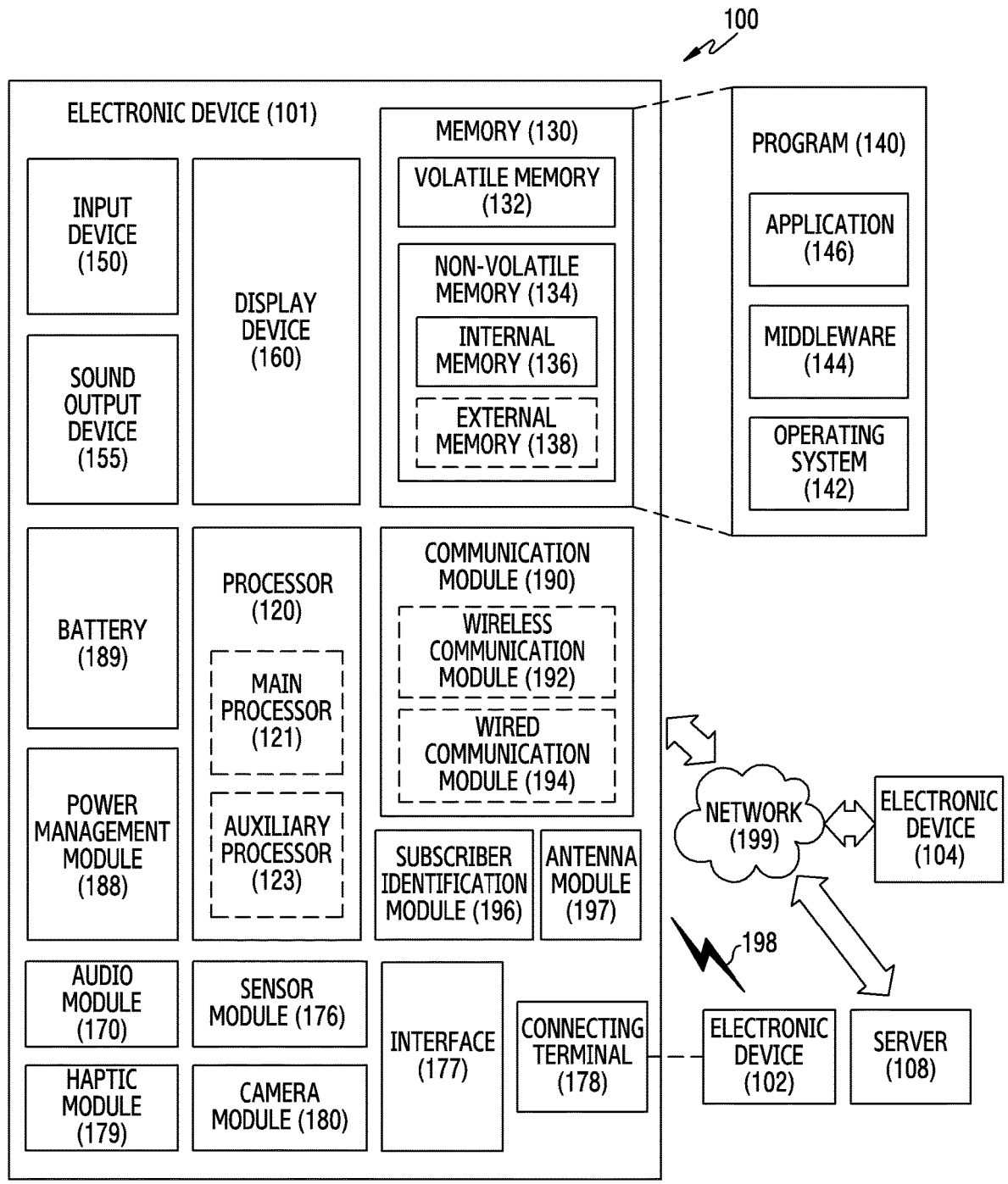
FIG. 1 is a block diagram illustrating an example electronic device in a network environment according to various embodiments.

FIG. 1 is a block diagram illustrating an electronic device (101) in a network environment (100) according to various embodiments. Referring to FIG. 1, the electronic device (101) in the network environment (100) may communicate with an electronic device (102) via a first network (198) (e.g., a short-range wireless communication network), or an electronic device (104) or a server (108) via a second network (199) (e.g., a long-range wireless communication network). According to an embodiment, the electronic device (101) may communicate with the electronic device (104) via the server (108). According to an embodiment, the electronic device (101) may include a processor (120), memory (130), an input device (150), a sound output device (155), a display device (160), an audio module (170), a sensor module (176), an interface (177), a haptic module (179), a camera module (180), a power management module (188), a battery (189), a communication module (190), a subscriber identification module (SIM) (196), or an antenna module (197). In some embodiments, at least one (e.g., the display device (160) or the camera module (180)) of the components may be omitted from the electronic device (101), or one or more other components may be added in the electronic device (101). In some embodiments, some of the components may be implemented as single integrated circuitry. For example, the sensor module (176) (e.g., a fingerprint sensor, an iris sensor, or an illuminance sensor) may be implemented as embedded in the display device (160) (e.g., a display).

The processor (120) may execute, for example, software (e.g., a program (140)) to control at least one other component (e.g., a hardware or software component) of the electronic device (101) coupled with the processor (120), and may perform various data processing or computation. According to an example embodiment, as at least part of the data processing or computation, the processor (120) may load a command or data received from another component (e.g., the sensor module (176) or the communication module (190)) in volatile memory (132), process the command or the data stored in the volatile memory (132), and store resulting data in non-volatile memory (134). According to an embodiment, the processor (120) may include a main processor (121) (e.g., a central processing unit (CPU) or an application processor (AP)), and an auxiliary processor (123) (e.g., a graphics processing unit (GPU), an image signal processor (ISP), a sensor hub processor, or a communication processor (CP)) that is operable independently from, or in conjunction with, the main processor (121). Additionally or alternatively, the auxiliary processor (123) may be adapted to consume less power than the main processor (121), or to be specific to a specified function. The auxiliary processor (123) may be implemented as separate from, or as part of the main processor (121).

The auxiliary processor (123) may control at least some of functions or states related to at least one component (e.g., the display device (160), the sensor module (176), or the communication module (190)) among the components of the electronic device (101), instead of the main processor (121) while the main processor (121) is in an inactive (e.g., sleep) state, or together with the main processor (121) while the main processor (121) is in an active state (e.g., executing an application). According to an embodiment, the auxiliary processor (123) (e.g., an image signal processor or a communication processor) may be implemented as part of another component (e.g., the camera module (180) or the communication module (190)) functionally related to the auxiliary processor (123).

The memory (130) may store various data used by at least one component (e.g., the processor (120) or the sensor module (176)) of the electronic device (101). The various data may include, for example, software (e.g., the program (140)) and input data or output data for a command related thereto. The memory (130) may include the volatile memory (132) or the non-volatile memory (134).

The program (140) may be stored in the memory (130) as software, and may include, for example, an operating system (OS) (142), middleware (144), or an application (146).

The input device (150) may receive a command or data to be used by other component (e.g., the processor (120)) of the electronic device (101), from the outside (e.g., a user) of the electronic device (101). The input device (150) may include, for example, a microphone, a mouse, a keyboard, or a digital pen (e.g., a stylus pen).

The sound output device (155) may output sound signals to the outside of the electronic device (101). The sound output device (155) may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device (160) may visually provide information to the outside (e.g., a user) of the electronic device (101). The display device (160) may include, for example, a display, a hologram device, or a projector and control circuitry to control a corresponding one of the display, hologram device, and projector. According to an embodiment, the display device (160) may include touch circuitry adapted to detect a touch, or sensor circuitry (e.g., a pressure sensor) adapted to measure the intensity of force incurred by the touch.

The audio module (170) may convert a sound into an electrical signal and vice versa. According to an embodiment, the audio module (170) may obtain the sound via the input device (150), or output the sound via the sound output device (155) or a headphone of an external electronic device (e.g., an electronic device (102)) directly (e.g., wiredly) or wirelessly coupled with the electronic device (101).

The sensor module (176) may detect an operational state (e.g., power or temperature) of the electronic device (101) or an environmental state (e.g., a state of a user) external to the electronic device (101), and then generate an electrical signal or data value corresponding to the detected state. According to an embodiment, the sensor module (176) may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface (177) may support one or more specified protocols to be used for the electronic device (101) to be coupled with the external electronic device (e.g., the electronic device (102)) directly (e.g., wiredly) or wirelessly. According to an embodiment, the interface (177) may include, for example, a high definition multimedia interface (HDMI), a universal serial bus (USB) interface, a secure digital (SD) card interface, or an audio interface.

A connecting terminal (178) may include a connector via which the electronic device (101) may be physically connected with the external electronic device (e.g., the electronic device (102)). According to an embodiment, the connecting terminal (178) may include, for example, a HDMI connector, a USB connector, a SD card connector, or an audio connector (e.g., a headphone connector).

The haptic module (179) may convert an electrical signal into a mechanical stimulus (e.g., a vibration or a movement) or electrical stimulus which may be recognized by a user via his tactile sensation or kinesthetic sensation. According to an embodiment, the haptic module (179) may include, for example, a motor, a piezoelectric element, or an electric stimulator.

The camera module (180) may capture a still image or moving images. According to an embodiment, the camera module (180) may include one or more lenses, image sensors, image signal processors, or flashes.

The power management module (188) may manage power supplied to the electronic device (101). According to an example embodiment, the power management module (188) may be implemented as at least part of, for example, a power management integrated circuit (PMIC).

The battery (189) may supply power to at least one component of the electronic device (101). According to an embodiment, the battery (189) may include, for example, a primary cell which is not rechargeable, a secondary cell which is rechargeable, or a fuel cell.

The communication module (190) may support establishing a direct (e.g., wired) communication channel or a wireless communication channel between the electronic device (101) and the external electronic device (e.g., the electronic device (102), the electronic device (104), or the server (108)) and performing communication via the established communication channel. The communication module (190) may include one or more communication processors that are operable independently from the processor (120) (e.g., the application processor (AP)) and supports a direct (e.g., wired) communication or a wireless communication. According to an embodiment, the communication module (190) may include a wireless communication module (192) (e.g., a cellular communication module, a short-range wireless communication module, or a global navigation satellite system (GNSS) communication module) or a wired communication module (194) (e.g., a local area network (LAN) communication module or a power line communication (PLC) module). A corresponding one of these communication modules may communicate with the external electronic device via the first network (198) (e.g., a short-range communication network, such as Bluetooth™, wireless-fidelity (Wi-Fi) direct, or infrared data association (IrDA)) or the second network (199) (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module (192) may identify and authenticate the electronic device (101) in a communication network, such as the first network (198) or the second network (199), using subscriber information (e.g., international mobile subscriber identity (IMSI)) stored in the subscriber identification module (196).

The antenna module (197) may transmit or receive a signal or power to or from the outside (e.g., the external electronic device) of the electronic device (101). According to an embodiment, the antenna module (197) may include a plurality of antennas. In such a case, at least one antenna appropriate for a communication scheme used in the communication network, such as the first network (198) or the second network (199), may be selected, for example, by the communication module (190) (e.g., the wireless communication module (192)) from the plurality of antennas. The signal or the power may then be transmitted or received between the communication module (190) and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device (101) and the external electronic device (104) via the server (108) coupled with the second network (199). Each of the electronic devices (102) and (104) may be a device of a same type as, or a different type, from the electronic device (101). According to an embodiment, all or some of operations to be executed at the electronic device (101) may be executed at one or more of the external electronic devices (102), (104), or (108). For example, if the electronic device (101) should perform a function or a service automatically, or in response to a request from a user or another device, the electronic device (101), instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device (101). The electronic device (101) may provide the outcome, with or without further processing of the outcome, as at least part of a reply to the request. To that end, a cloud computing, distributed computing, or client-server computing technology may be used, for example.

Figure 2:
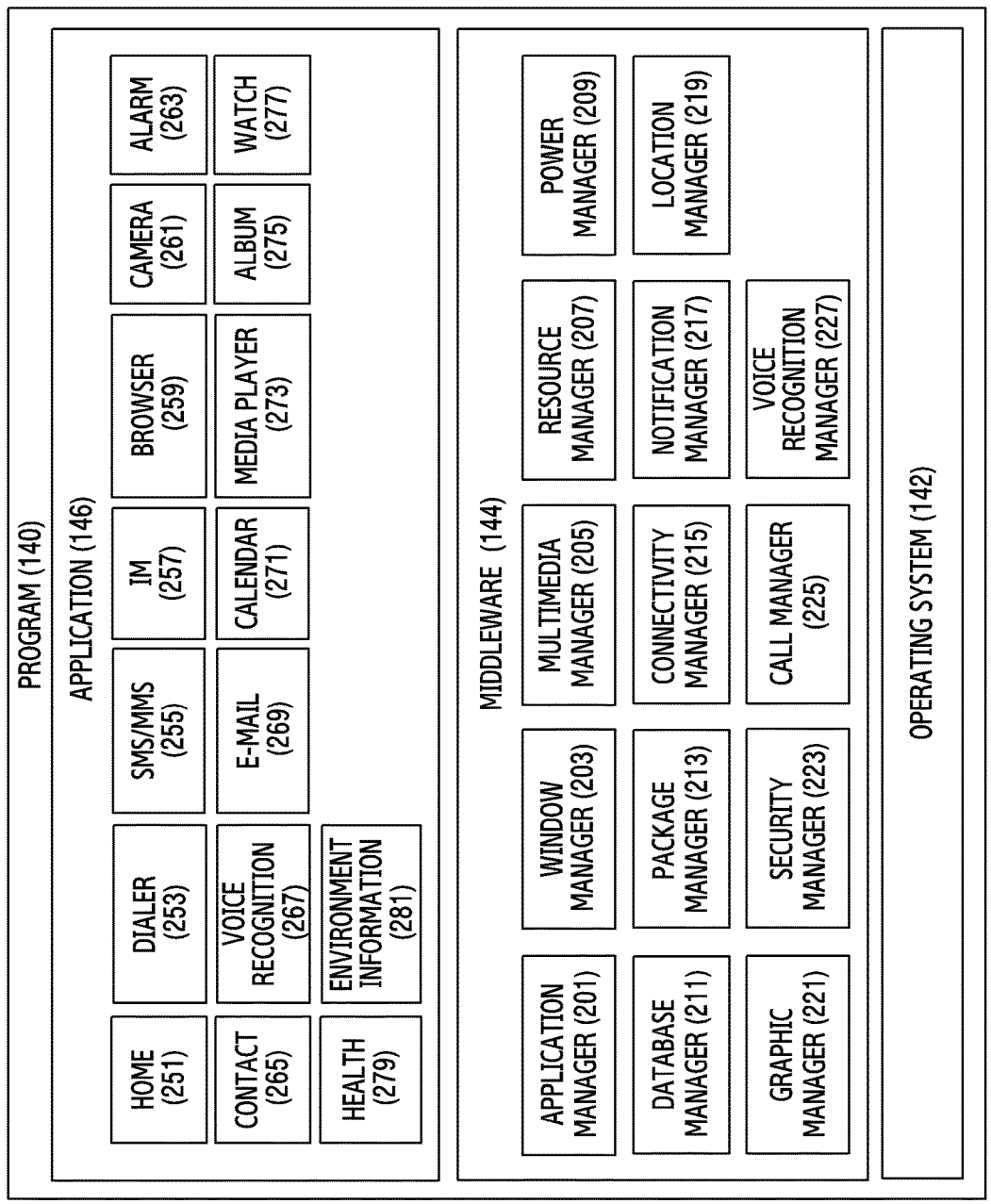
FIG. 2 is a block diagram illustrating an example program according to various embodiments.

FIG. 2 is a block diagram (200) illustrating the program (140) according to various embodiments. According to an embodiment, the program (140) may include an operating system (OS) (142) to control one or more resources of the electronic device (101), middleware (144), or an application (146) executable in the OS (142). The OS (142) may include, for example, Android™, iOS™, Windows™, Symbian™, Tizen™, or Bada™. At least part of the program (140), for example, may be pre-loaded on the electronic device (101) during manufacture, or may be downloaded from or updated by an external electronic device (e.g., the electronic device (102) or (104), or the server (108)) during use by a user.

The OS (142) may control management (e.g., allocating or deallocation) of one or more system resources (e.g., process, memory, or power source) of the electronic device (101). The OS (142), additionally or alternatively, may include one or more driver programs to drive other hardware devices of the electronic device (101), for example, the input device (150), the sound output device (155), the display device (160), the audio module (170), the sensor module (176), the interface (177), the haptic module (179), the camera module (180), the power management module (188), the battery (189), the communication module (190), the subscriber identification module (196), or the antenna module (197).

The middleware (144) may provide various functions to the application (146) such that a function or information provided from one or more resources of the electronic device (101) may be used by the application (146). The middleware (144) may include, for example, an application manager (201), a window manager (203), a multimedia manager (205), a resource manager (207), a power manager (209), a database manager (211), a package manager (213), a connectivity manager (215), a notification manager (217), a location manager (219), a graphic manager (221), a security manager (223), a telephony manager (225), or a voice recognition manager (227).

The application manager (201), for example, may manage the life cycle of the application (146). The window manager (203), for example, may manage one or more graphical user interface (GUI) resources that are used on a screen. The multimedia manager (205), for example, may identify one or more formats to be used to play media files, and may encode or decode a corresponding one of the media files using a codec appropriate for a corresponding format selected from the one or more formats. The resource manager (207), for example, may manage the source code of the application (146) or a memory space of the memory (130). The power manager (209), for example, may manage the capacity, temperature, or power of the battery (189), and determine or provide related information to be used for the operation of the electronic device (101) based at least in part on corresponding information of the capacity, temperature, or power of the battery (189). According to an embodiment, the power manager (209) may interwork with a basic input/output system (BIOS) (not shown) of the electronic device (101).

The database manager (211), for example, may generate, search, or change a database to be used by the application (146). The package manager (213), for example, may manage installation or update of an application that is distributed in the form of a package file. The connectivity manager (215), for example, may manage a wireless connection or a direct connection between the electronic device (101) and the external electronic device. The notification manager (217), for example, may provide a function to notify a user of an occurrence of a specified event (e.g., an incoming call, message, or alert). The location manager (219), for example, may manage locational information on the electronic device (101). The graphic manager (221), for example, may manage one or more graphic effects to be offered to a user or a user interface related to the one or more graphic effects.

The security manager (223), for example, may provide system security or user authentication. The telephony manager (225), for example, may manage a voice call function or a video call function provided by the electronic device (101). The voice recognition manager (227), for example, may transmit a user's voice data to the server (108), and receive, from the server (108), a command corresponding to a function to be executed on the electronic device (101) based at least in part on the voice data, or text data converted based at least in part on the voice data. According to an embodiment, the middleware (144) may dynamically delete some existing components or add new components. According to an embodiment, at least part of the middleware (244) may be included as part of the OS (142) or may be implemented as another software separate from the OS (142).

The application (146) may include, for example, a home (251), dialer (253), short message service (SMS)/multimedia messaging service (MMS) (255), instant message (IM) (257), browser (259), camera (261), alarm (263), contact (265), voice recognition (267), email (269), calendar (271), media player (273), album (275), watch (277), health (279) (e.g., for measuring the degree of workout or biometric information, such as blood sugar), or environmental information (281) (e.g., for measuring air pressure, humidity, or temperature information) application. According to an embodiment, the application (146) may further include an information exchanging application (not shown) that is capable of supporting information exchange between the electronic device (101) and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application (269)) of the electronic device (101) to the external electronic device. Additionally or alternatively, the notification relay application may receive notification information from the external electronic device and provide the notification information to a user of the electronic device (101).

The device management application may control the power (e.g., turn-on or turn-off) or the function (e.g., adjustment of brightness, resolution, or focus) of the external electronic device or some component thereof (e.g., a display device or a camera module of the external electronic device). The device management application, additionally or alternatively, may support installation, delete, or update of an application running on the external electronic device.

Figure 3:
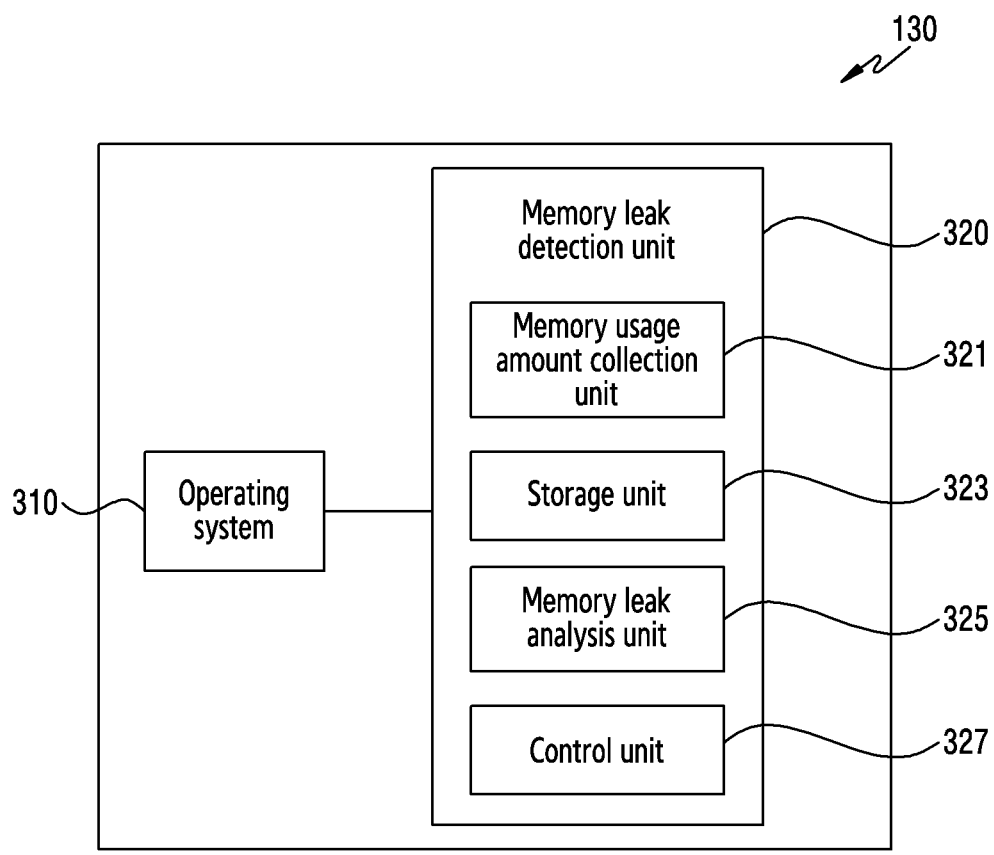
FIG. 3 is a block diagram illustrating an example configuration of a memory according to various embodiments.

FIG. 3 is a block diagram illustrating an example configuration of a memory 130 according to various embodiments.

Referring to FIG. 3, the memory 130 may include (or store) an operating system 310 (e.g., the operating system 142 of FIG. 1) and a memory leak detection unit (e.g., including various processing circuitry and/or executable program elements) 320.

According to various embodiments, the operating system 310 may be executed by an electronic device (e.g., the processor (120) of the electronic device FIG. 1), and may include data and a program that manages hardware and software resources.

According to various embodiments, the memory leak detection unit 320 may be included in middleware (e.g., the middleware 144 of FIG. 1). The memory leak detection unit 320 may be executed by a processor (e.g., the processor 120) of the electronic device 101, and may periodically monitor the amount of memory usage by at least one process running on the operating system 310, to determine whether a memory leak occurs. When the occurrence of a memory leak is detected, the memory leak detection unit 320 may terminate the process in which the memory leak has occurred, may provide information on the process in which the memory leak has occurred, or may provide an external electronic device (e.g., the server 108 of FIG. 1) with the information on the process in which the memory leak has occurred. According to an embodiment, the memory leak detection unit 320 may include a memory usage amount collection unit (e.g., including various processing circuitry and/or executable program elements) 321, a storage unit (e.g., including a memory) 323, a memory leak analysis unit (e.g., including various processing circuitry and/or executable program elements) 325, and a control unit (e.g., including various processing circuitry and/or executable program elements) 327. The configuration of the memory usage amount collection unit 321, the storage unit 323, the memory leak analysis unit 325, and the control unit 327 is divided for convenience of explanation, and the configuration of the memory leak detection unit 320 is not limited thereto.

According to various embodiments, the memory usage amount collection unit 321 may include various processing circuitry and/or executable program elements and acquire memory usage information (e.g., the amount of memory usage) for at least one process executed on the operating system 310, based on a collection period configured according to a characteristic of the process. When the process is related to an initially installed (preloaded or native) program or related to the system of the electronic device 101, the memory usage amount collection unit 321 may determine a characteristic of the process to be a first characteristic, and when the process is related to a program downloadable from the external electronic device, the memory usage amount collection unit 321 may determine the characteristic of the process to be a second characteristic. When the characteristic of the process is the first characteristic, the memory usage amount collection unit 321 may acquire first memory usage information for the process in a first period, and may acquire second memory usage information for the process in a second period that is longer than the first period. As another example, when the characteristic of the process is the second characteristic, the memory usage amount collection unit 321 may acquire third memory usage information for the process in a third period, and may acquire fourth memory usage information for the process in a fourth period that is longer than the third period.

According to various embodiments, when the characteristic of the process is the first characteristic, because the memory 130 has a small usage amount and the process has a high importance, a probability that the process is terminated may be lower than that of the second characteristic. Therefore, the first period may be configured to be longer than the third period, and the second period may be configured to be longer than the fourth period. However, the disclosure is not limited thereto. For example, the first period may be configured to be shorter than the third period.

According to various embodiments, the memory usage amount collection unit 321 may identify memory usage information on the process by summing a swap proportional set size (pss) value and a pss value of the process. The pss value may refer to a value obtained by summing the size of a memory area used only in the process and a value obtained dividing the size of a memory area shared between processes running on the operating system 142 by the number of running processes. The swap pss value may refer to the size of data that is not frequently used in the process, the data being compressed and stored in another area of the memory 130.

According to various embodiments, a period configured according to the characteristic of the process may be changed to another value based on a user input or a signal received from an external electronic device. Accordingly various embodiments, the memory usage amount collection unit 321 may secure as many pieces of memory usage information as the reference number (or amount). For example, when as many pieces of memory usage information as the reference number (e.g., 60), which are acquired in a collection period configured according to the characteristic of the process, are acquired, the memory usage amount collection unit 321 may maintain memory usage information acquired thereafter, and may delete memory usage information having been acquired at an early time, so as to maintain as many pieces of the memory usage information as the reference number. According to various embodiments, the memory usage information may be stored in a partial space of a volatile memory (e.g., the volatile memory 132 of FIG. 1), or may be stored in the form of a file in a non-volatile memory (e.g., the non-volatile memory 134 of FIG. 1).

According to various embodiments, the memory usage amount collection unit 321 may acquire the memory usage information on the process from the time point at which a predesignated time is elapsed from the time point at which the electronic device 101 is booted or the electronic device 101 is booted. According to various embodiments, the memory usage amount collection unit 321 may store the acquired memory used information in the storage unit 323.

According to various embodiments, the memory leak analysis unit 325 may include various processing circuitry and/or executable program elements and determine whether a memory leak of the process occurs by analyzing the memory usage information stored in the storage unit 323. For example, when as many pieces of memory usage information as a reference number are stored in the storage unit 323, by assigning a data value of the memory usage information to a linear regression algorithm, the memory leak analysis unit 325 may identify a change pattern of the amount of memory usage, and may determine whether the identified changed pattern satisfies a designated condition, so as to determine whether a memory leak of the process occurs. When the memory leak of the process occurs, the memory leak analysis unit 325 may provide the control unit 327 with information on the process in which the memory leak has occurred.

According to various embodiments, the memory leak analysis unit 325 may determine whether a memory leak of the process occurs, by analyzing each of multiple pieces of memory usage information (e.g., first memory usage information and second memory usage information, or third memory usage information and fourth memory usage information) acquired based on different periods (e.g., the first period, the second period, the third period, and the fourth period) from one process. The memory leak analysis unit 325 may also detect not only a short-term memory leak but also a long-term memory leak of one process, by analyzing multiple pieces of usage information acquired in different periods with respect to the one process, thereby determining whether a memory leak occurs.

According to various embodiments, the control unit 327 may include various processing circuitry and/or executable program elements and control the process in which a memory leak has occurred, based on information provided from the memory leak analysis unit 325. For example, when information of a process in which a memory leak has occurred is provided from the memory leak analysis unit 325, the control unit 327 may terminate the process in which the memory process has occurred. As another example, when information of a process in which a memory leak has occurred is provided from the memory leak analysis unit 325, the control unit 327 may display, to a user, a notification screen for providing a notification of the process in which a memory leak has occurred, and may control (e.g., maintaining execution, terminating, and rebooting) the process in which a memory leak has occurred, based on a user input in response to the notification screen. According to various embodiments, the control unit 327 may provide an external electronic device (e.g., the server 108 of FIG. 1) with information on the process in which a memory leak has occurred.

According to various embodiments, an electronic device may include a processor (e.g., the processor 120 of FIG. 1), and a memory (e.g., the memory 130 of FIG. 1) operatively connected to the processor, wherein the memory may store instructions which, when executed, by the processor control the electronic device to: acquire usage information for the memory of a process executed by the processor based on a collection period determined based at least in part on a characteristic of the process; identify a change pattern of a usage amount for the memory of the process based on the usage information; and determine whether a memory leak occurs based on the change pattern of the usage amount.

According to various embodiments, the instructions may, when executed by the processor, control the electronic device to, based on a characteristic of the process being a first characteristic, acquire first usage information (first memory usage information) for the memory of the process based on a first period, and acquire second usage information (second memory usage information) for the memory of the process based on a second period.

According to various embodiments, the instructions may, when executed by the processor, control the electronic device to, based on the characteristic of the process being a second characteristic, acquire third usage information (third memory usage information) for the memory of the process based on a third period, and acquire fourth usage information (fourth memory usage information) for the memory of the process based on a fourth period.

According to various embodiments, the instructions may, when executed by the processor, control the electronic device to: determine whether as many pieces of the usage information as a reference number are acquired; and based on as many pieces of the usage information as the reference number being acquired, identify a change pattern of the usage amount using a linear regression algorithm.

According to various embodiments, the instructions may, when executed by the processor, control the electronic device to: determine whether the change pattern of the usage amount exceeds a reference value; and based on the change pattern of the usage amount exceeding the reference value, detect that a memory leak of the process occurs.

According to various embodiments, the electronic device may further include a communication circuit (e.g., the communication circuit 190 of FIG. 1), wherein the instructions, when executed by the processor, control the electronic device to change the reference value based on an input and/or a signal received from the external electronic device via the communication circuit.

According to various embodiments, the electronic device may further include a communication circuit, wherein the instructions, when executed by the processor, control the electronic device to transmit information on the process to the external electronic device via the communication circuit based on the memory leak occurring.

According to various embodiments, the instructions may, when executed by the processor, control the electronic device to change the collection period based on the input and/or the signal received from the external electronic device via the communication circuit.

According to various embodiments, the instructions may, when executed by the processor, control the electronic device to terminate the process based on the memory leak occurring.

According to various embodiments, the electronic device may further include a display (e.g., the display device 160 of FIG. 1), wherein the instructions, when executed by the processor, control the electronic device to, based on the memory leak occurring, display a notification screen for the process via the display, and control the process based on an a input to the notification screen.

Figure 4:
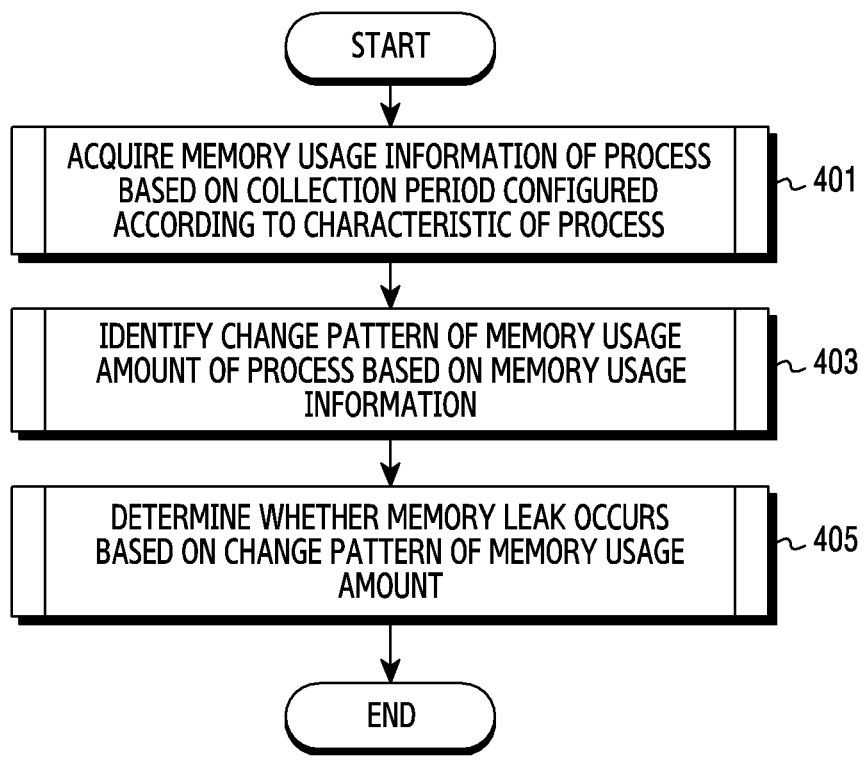
FIG. 4 is a flowchart illustrating an example method for detecting the occurrence of a memory leak in the electronic device according to various embodiments.

FIG. 4 is a flowchart illustrating an example method for detecting the occurrence of a memory leak in the electronic device according to various embodiments.

Referring to FIG. 4, in operation 401 according to various embodiments, a processor (e.g., the processor 120 of FIG. 1) of an electronic device (e.g., the electronic device 101 of FIG. 1) may acquire memory usage information of a process executed by an operating system (e.g., the operating system 142 of FIG. 1 or the operating system 310 of FIG. 3) of the electronic device, based on a collection period configured according to a characteristic of the process. For example, when the characteristic of the process executed on the operating system 142 or 310 is a first characteristic, the processor 120 may acquire first memory usage information on the process based on a first period, and may acquire second memory usage information for the process based on a second period. For example, the first period may be shorter than the second period. As another example, when the characteristic of the process executed on the operating system 142 or 310 is a second characteristic, the processor 120 may acquire third memory usage information for the process based on a third period, and may additionally acquire fourth memory usage information for the process based on a fourth period. For example, the third period may be shorter than the fourth period. According to various embodiments, when the process executed on the operating system 142 or 310 is related to a program preloaded or native to the electronic device, or related to the system of the electronic device, the processor 120 may determine the characteristic of the to be a first characteristic, and when the process executed on the operating system is related to a program downloadable from an external electronic device, the processor 120 may determine the characteristic of the process to be a second characteristic. Accordingly various embodiments, the processor 120 may secure as many pieces of memory usage information on the process as the reference number (or amount). For example, when as many pieces of the memory usage information as the reference number, which are acquired in a collection period configured according to the characteristic of the process, are acquired, the processor 120 may maintain memory usage information acquired thereafter, and may delete memory usage information having been acquired at an early time, so as to maintain as many pieces of the memory usage information as the reference number. According to various embodiments, the memory usage information may be stored in a partial space of a volatile memory (e.g., the volatile memory 132 of FIG. 1), or may be stored in the form of a file in a non-volatile memory (e.g., the non-volatile memory 134 of FIG. 1). According to various embodiments, the memory usage information may be acquired from the point in time at which the electronic device is booted, or from the point in time at which a designated time (e.g., 10 minutes) has elapsed since the time at which the electronic device was booted.

According to various embodiments, in operation 403, the processor 120 may identify a change pattern of a usage amount for the memory of the process based on the memory usage information. For example, the processor 120 may determine whether as many pieces of memory usage information as the reference number are acquired, wherein the memory usage information is at least one piece of memory usage information among multiple pieces of memory usage information (e.g., first memory usage information and second memory usage information, or third memory usage information and fourth memory usage information) acquired in different periods with respect to one process. When as many pieces of the at least one memory usage information as the reference number are acquired, the processor may identify the change pattern of the memory usage amount of the process by using the linear regression algorithm.

According to various embodiments, in operation 405, the processor 120 may determine whether a memory leak occurs, based on the change pattern of the memory usage amount. For example, when a slope of the change pattern of the memory usage pattern exceeds a reference slope, the processor 120 may determine that a memory leak has occurred. According various embodiments, the reference slope may be configured differently according to a collection period and a characteristic of a process. For example, when the characteristic of the process is a first characteristic, and the collection period is a first period, the reference slope may be configured to be a first value (e.g., 4 MB/20 mins). As another example, when the characteristic of the process is the first characteristic, and the collection period is a second period, the reference slope may be configured to be a second value (e.g., 4 MB/60 mins). As still another example, when the characteristic of the process is the second characteristic, and the collection period is a third period, the reference slope may be configured to be a third value (e.g., 4 MB/10 mins). As still another example, when the characteristic of the process is the second characteristic, and the collection period is a fourth period, the reference slope may be configured to be a fourth value (e.g., 4 MB/20 mins). According to various embodiments, the reference slope may be changed to another value based on a user input or a signal received from an external electronic device (e.g., the server 108 of FIG. 1).

According to various embodiments, the electronic device 101 may acquire memory usage information of a process based on a collection period configured according to a characteristic of the process, and may analyze the acquired memory usage information on the process to determine whether a memory leak has occurred. For example, with respect to each of all processes running on an operating system, the electronic device 101 may identify, by performing operations 401 to 405, a process, in which a memory leak has occurred, from among multiple processes running on the operating system.

According to various embodiments, the electronic device 101 may analyze multiple pieces of memory usage information acquired in different periods with respect to one process, and may determine whether a memory leak occurs, to detect not only a short-term memory leak but also a long-term memory leak occurring in the one process.

The above description shows that operation 401 of collecting memory usage information of a process is performed, and then operation 403 of identifying a use pattern of a memory usage amount of the process is performed. However, according to various embodiments, the electronic device 101 may perform, together, operation 401 of collecting memory usage information of a process and operation 403 of identifying a use pattern of a memory usage amount of the process.

Figure 5:
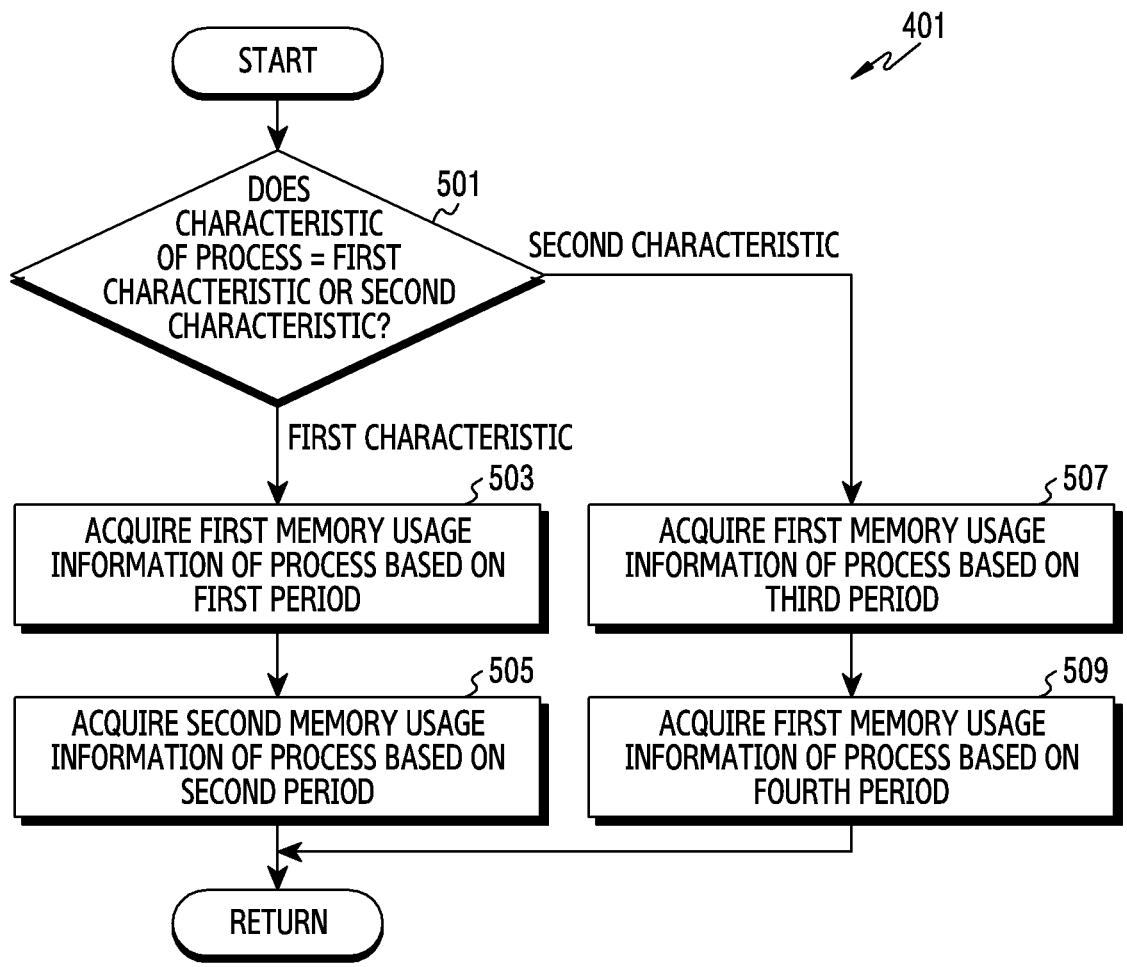
FIG. 5 is a flowchart illustrating an example method for collecting memory usage information of a process in the electronic device according to various embodiments.

FIG. 5 is a flowchart illustrating an example method for collecting memory usage information of a process in the electronic device according to various embodiments. The following description may, for example, be an operation of operation 401 of FIG. 4 according to an example embodiment.

Referring to FIG. 5, in operation 501 according to various embodiments, a processor (e.g., the processor 120 of FIG. 1) of an electronic device (e.g., the electronic device 101 of FIG. 1) may determine whether a characteristic of a process is a first characteristic or a second characteristic. For example, when a process executed on an operating system (e.g., the operating system 142 of FIG. 1 or the operating system 310 of FIG. 3) is related to a program initially preloaded or native to the electronic device or related to the system of the electronic device, the processor 120 may determine the characteristic of the process to be the first characteristic. As another example, when the process executed on the operating system 142 or 310 is related to a program downloaded from an external electronic device (e.g., the server 108 of FIG. 1), the processor 120 may determine the characteristic of the process to be the second characteristic. When the characteristic of the process is the first characteristic, the processor 120 may perform operation 503 to operation 505, and when the characteristic of the process is the second characteristic, the processor 120 may perform operation 507 to operation 509.

According to various embodiments, in operation 503, when the characteristic of the process is determined to be the first characteristic, the processor 120 may acquire first memory usage information on the process based on a first period. For example, the processor 120 may identify a capacity, which the process occupies in a memory (e.g., the memory 130 of FIG. 1) in each first period, and may store information of the identified capacity in the memory 130. According to various embodiments, the processor 120 may secure as many pieces of the first memory usage information as a reference number (or amount). For example, the processor 120 may continuously acquire the first memory usage information on the process in each first period, and when the number of pieces of the first memory usage information exceeds the reference number, the processor 120 may maintain as many pieces of the first memory usage information as the reference number by deleting the oldest first memory usage information.

According to various embodiments, in operation 505, the processor 120 may acquire second memory usage information on the process based on a second period. For example, the processor 120 may identify a capacity which the process occupies in the memory 130 in each second period that is longer than the first period, and may store information of the identified capacity in the memory 130. For example, the first period and the second period are values determined by considering that the characteristic of the process is the first characteristic, and may be changed to other values based on a user input or a signal received from an external electronic device (e.g., the server 108 of FIG. 1). According to various embodiments, the processor 120 may secure as many pieces of the second memory usage information as a reference number, like the first memory usage information. According to various embodiments, operation 505 of collecting the second memory usage information for the process based on the second period may be currently performed with operation 503 of collecting the first memory usage information for the process based on the first period.

According to various embodiments, in operation 507, when the characteristic of the process is determined to be the second characteristic, the processor 120 may acquire third memory usage information on the process based on a third period. For example, the processor 120 may identify a capacity which the process occupies in the memory 130 in each first period, and may store information of the identified capacity in the memory 130. According to various embodiments, the processor may secure as many pieces of the third memory usage information as the reference number (or amount), like the first memory usage information.

According to various embodiments, in operation 509, the processor 120 may acquire the third memory usage information on the process based on a fourth period. For example, the processor 120 may identify a capacity which the process occupies in the memory 130 in each fourth period that is longer than the third period, and may store information of the identified capacity in the memory 130. For example, the third period and the fourth period are values determined by considering that the characteristic of the process is the second characteristic, and may be changed to other values based on a user input or a signal received from an external electronic device. According to various embodiments, the processor 120 may secure as many pieces of the fourth memory usage information as the reference number (or amount), like the first memory usage information. According to various embodiments, operation 509 of collecting the fourth memory usage information for the process based on the fourth period may be currently performed with operation 507 of collecting the third memory usage information for the process based on the third period.

According various embodiments, by differently configuring the collection period for acquiring memory usage information according to the characteristic of the process, the electronic device 101 may acquire a sample having a much higher reliability than a case of acquiring memory usage information according to a uniform collection period without considering the characteristics of a process.

According to various embodiments, the electronic device 101 may acquire memory usage information of one process in different periods, so that not only a short-term memory leak but also a long-term memory leak occurring in one process can be detected.

Figure 6:
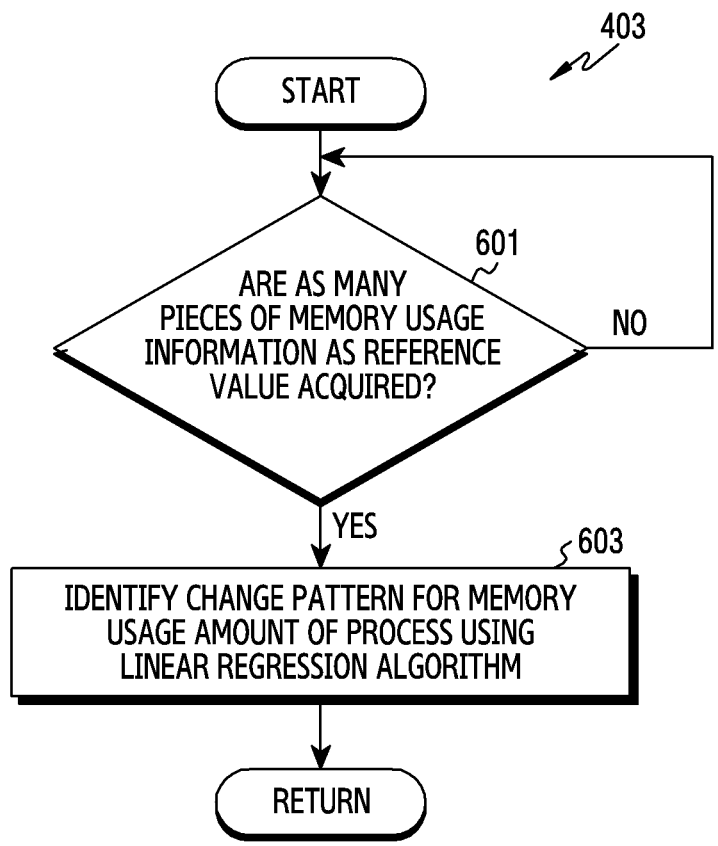
FIG. 6 is a flowchart illustrating an example method for identifying a change pattern of a memory usage amount of a program in the electronic device according to various embodiments.
Figure 7:
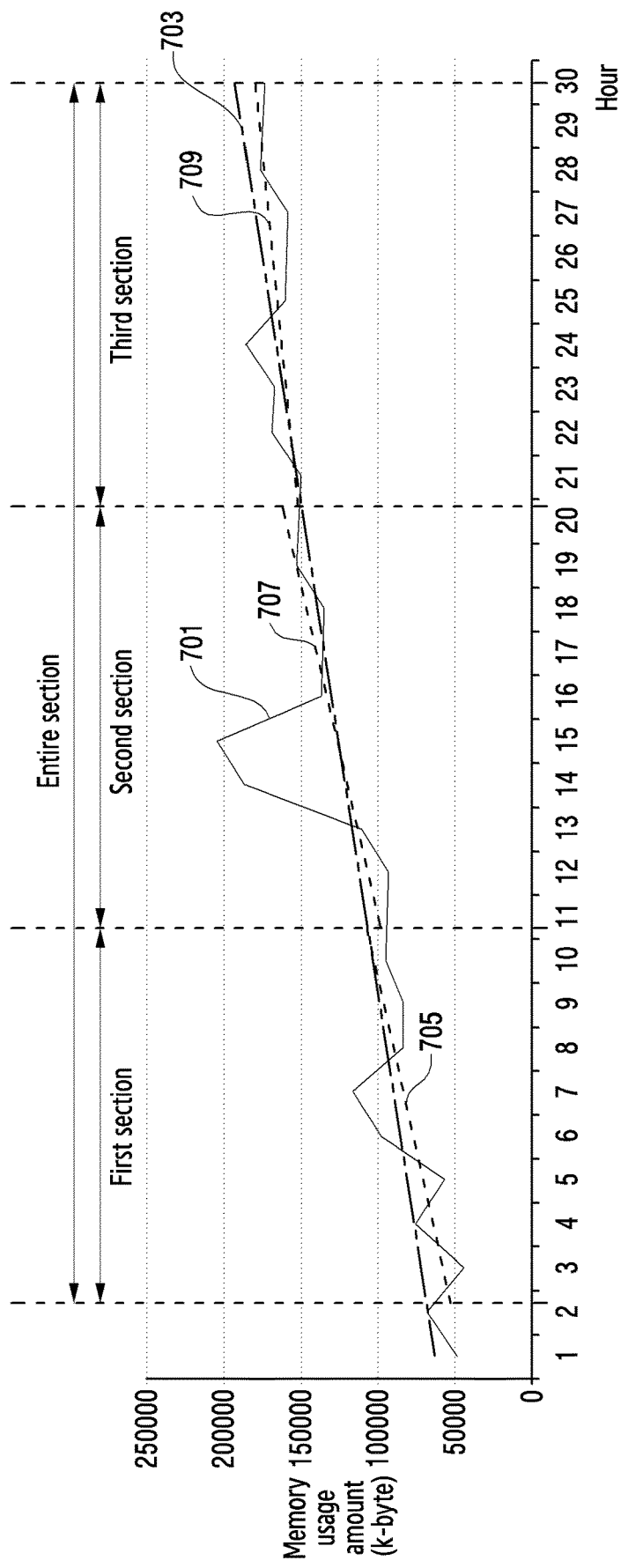
FIG. 7 is graph illustrating an example method for identifying a change pattern of a memory usage amount of a program in the electronic device according to various embodiments.

FIG. 6 is a flowchart illustrating an example method for identifying a change pattern of a memory usage amount of a program in the electronic device according to various embodiments. FIG. 7 is a graph illustrating an example method for identifying a change pattern of a memory usage amount of a program in the electronic device according to various embodiments. The following description may be an operation of operation 403 of FIG. 4 according to an example embodiment.

Referring to FIG. 6 and FIG. 7, in operation 601 according to various embodiments, a processor (e.g., the processor 120 of FIG. 1) of an electronic device (e.g., the electronic device 101 of FIG. 1) may determine whether as many pieces of memory usage information of a process as a reference number (e.g., 60) have been acquired. The reference number is a value configured by considering a characteristic of the process, and may be changed to another value based on a user input or a signal received from an external electronic device (e.g., the server 108). The processor 120 may perform operation 603 when as many pieces of memory usage information as the reference number have been acquired, and may re-perform operation 601 when as many pieces of the memory usage information as the reference number have not been received.

According to various embodiments, in operation 603, the processor 120 may identify a change pattern of a usage amount for the memory of the process based on a linear regression algorithm, when as many pieces of the memory usage information as the reference number have been acquired. For example, the processor 120 may express, as shown in FIG. 7, a change pattern of a memory usage amount of a process, using a linear function 703 (e.g., y=Wx+b), by applying a data value 701 of memory usage information on the process to [Equation 2] obtained by differentiating a cost function of [Equation 1] below.

$$\text{cost}(W) = \frac{1}{m}\sum_{i=1}^{m}(Wx^{(i)} - y^{(i)})^2 \quad \text{[Equation 1]}$$

$$W = \frac{\sum_{i=1}^{m}(y^i - y_{avg})x^i}{\sum_{i=1}^{m}(x^i - x_{avg})x^i}, \; b = y_{avg} - Wx_{avg} \quad \text{[Equation 2]}$$

In [Equation 2], "i" may refer to an index number of collected memory usage information, "x" may refer to time data, "y" may refer to a memory usage amount, "$x_{avg}$" may refer to an average of time data during a collecting time period, and "$y_{avg}$" may refer to an average of memory usage amount of the process during the collecting time period.

According to various embodiments, the processor 120 may express the change pattern of the memory usage amount of the process into a set of n linear functions, by dividing data values of the memory usage information into n sections and then applying the data values of the respective divided sections to [Equation 2]. For example, as shown in FIG. 7, the processor 120 may divide the data values 701 of the memory usage information into three sections (e.g., a first section, a second section, and a third section) based on the time axis, and apply the data values of the respective sections to [Equation 2], so as to determine linear functions 705, 707, and 709 for the respective sections. According to various embodiments, the number of sections obtained by dividing the data values of the memory usage information may be changed to various values based on a user input or a signal received from an external electronic device.

According to various embodiments, the electronic device 101 may identify a change of the memory usage amount, by expressing the change pattern of the memory usage amount of each of processes executed on the operating system 143 or 310, into a linear function derived based on the linear regression algorithm.

Figure 8:
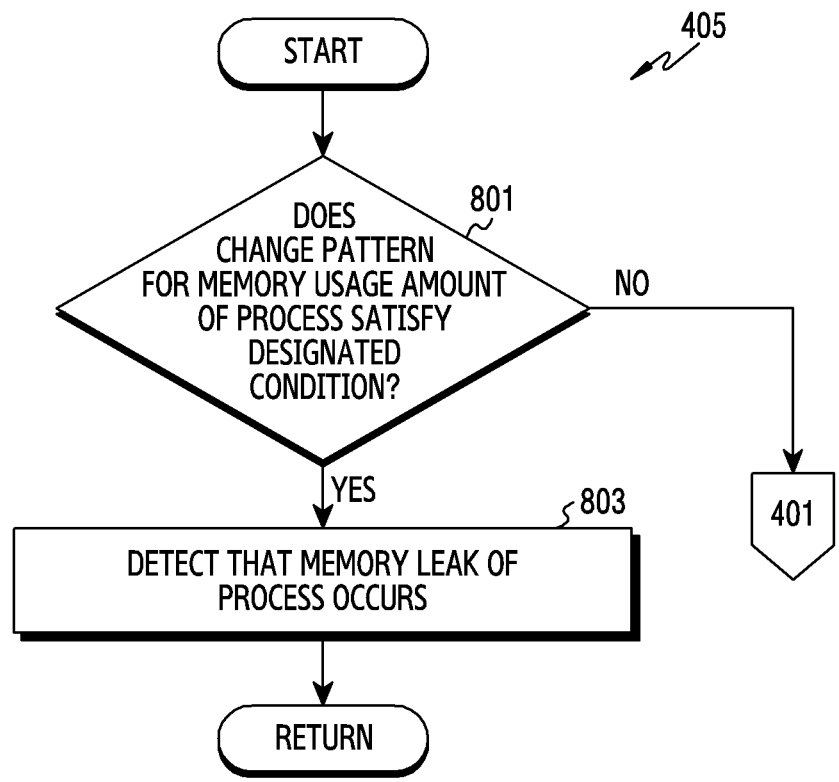
FIG. 8 is a flowchart illustrating an example method for determining whether a memory leak of a program occurs in the electronic device according to various embodiments.

FIG. 8 is a flowchart illustrating an example method for determining whether a memory leak of a program occurs in the electronic device according to various embodiments. The following description may be an operation of operation 405 in FIG. 4 according to an example embodiment.

Referring to FIG. 8, in operation 801 according to various embodiments, a processor (e.g., the processor 120 of FIG.) of an electronic device (e.g., the electronic device 101) may determine whether a change pattern of a memory usage amount of a process satisfies a designated condition. For example, the processor 120 may determine whether the change pattern of the memory usage amount of the process exceeds a reference value. For example, as shown in FIG. 7, the processor 120 may determine whether a slope (e.g., W in Equation 2) of the linear function 703 for the entire section of the data value 701 exceeds a reference slope, by applying the data value 701 of the memory usage information on the process to [Equation 2]. When the slope of the linear function 703 for the entire section of the data value 701 exceeds the reference slope, the processor 120 may determine that the change pattern of the memory usage amount exceeds the reference value. As another example, as shown in FIG. 7, the processor 120 may determine that the slopes of the multiple respective linear functions 705, 707, and 709, which are obtained by dividing the data values 701 of the memory usage information and applying the divided values to [Equation 2], have positive values, and may determine whether the slopes of the multiple linear functions exceed the reference slope. When the linear functions 705, 707, and 709 obtained for the respective sections may have the respective slopes having positive values, and when the slopes of the multiple linear functions exceed the reference slopes, the processor 120 may determine that the change pattern of the memory usage amount exceeds the reference value. As another example, as shown in FIG. 7, the processor 120 may concurrently perform an operation of determining whether the slope (e.g., Win Equation 1) of the linear function 703 for the entire section exceeds the reference slope, and an operation of determining that the slopes of the respective first functions 705, 707, and 709 obtained for the respective multiple sections have positive values, and whether the slopes of the linear functions exceed the reference slope. When the slope of the linear function 703 of the entire section exceeds the reference slope, or the slopes of the respective first linear functions 705, 707, and 709 obtained for the respective sections have positive values and the slops of the linear functions exceed the reference slope, the processor 120 may determine that the change pattern of the memory usage amount exceeds the reference value.

When it is determined that the change pattern of the memory usage amount exceeds the reference value, the processor 120 may perform operation 803, and may re-perform operation 401 of FIG. 4, which is for the case where it is determined that the change pattern of the memory usage amount has a value equal to or smaller than the reference value. According to various embodiments, the reference slope may be configured to be a different value according to the characteristic of the process and the collection period of the memory usage information. For example, when a characteristic of the process is a first characteristic, and a collection period of memory usage information is a first period, the reference slop may be configured to be a first value (e.g., 4 MB/20 mins), and when the characteristic of the process is the first characteristic and the collection period of the memory usage information is a second period, the reference slope may be configured to be a second value (e.g., 4 MB/60 mins). As another example, when the characteristic of the process is a second characteristic, and a collection period of memory usage information is a third period, the reference slop may be configured to be a third value (e.g., 4 MB/10 mins), and when the characteristic of the process is the second characteristic and the collection period of the memory usage information is a fourth period, the reference slope may be configured to be a fourth value (e.g., 6 MB/20 mins).

According to various embodiments, in operation 803, when the change pattern of the memory usage amount of the process satisfies a designated condition, the processor may detect that a memory leak of the process occurs.

According to various embodiments, the electronic device 101 may detect not only a short-term memory leak phenomenon but also a long-term memory leak phenomenon, by detecting a memory leak using multiple pieces of memory usage information acquired in different periods from the process.

Figure 9:
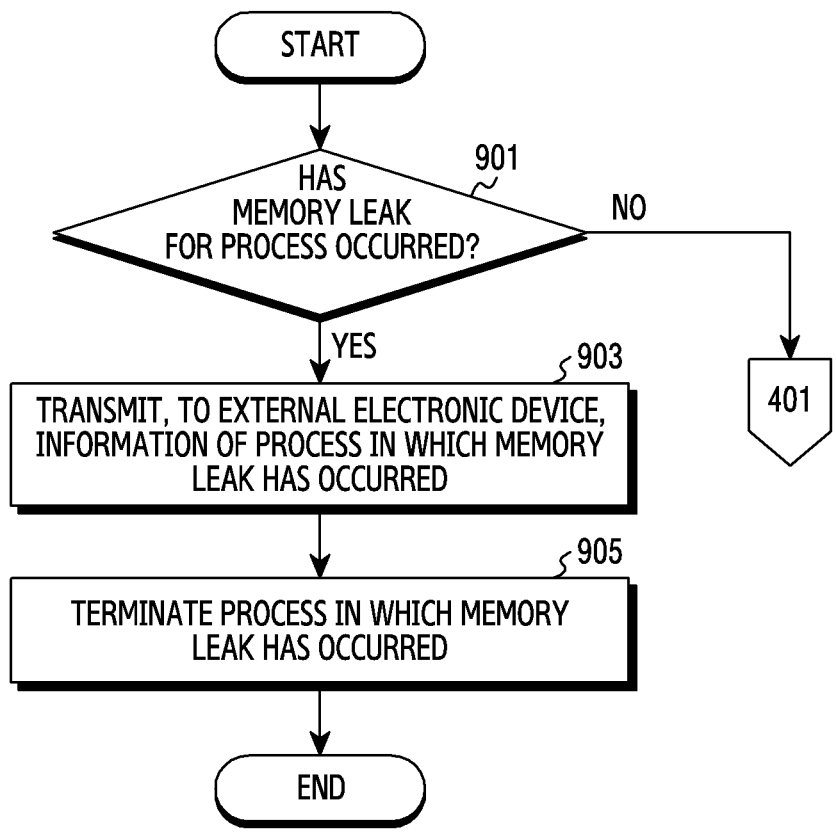
FIG. 9 is a flowchart illustrating an example method for controlling a process in which a memory leak has occurred in the electronic device according to various embodiments.

FIG. 9 is a flowchart illustrating an example method for controlling a process in which a memory leak has occurred in the electronic device according to various embodiments. The following description may be an operation performed after operation 405 of FIG. 4 is performed.

Referring to FIG. 9, in operation 901 according to various embodiments, a processor (e.g., the processor 120 of FIG. 1) of an electronic device (e.g., the electronic device 101 of FIG. 1) may determine whether a memory leak for a process occurs. For example, the processor 120 may determine whether a memory leak for a process occurs, by performing operations of operations 401 to 405 of FIG. 4 with respect to each of multiple processes executed on an operating system (e.g., the operating system 142 of FIG. 1 or the operating system 310 of FIG. 3) of the electronic device. When a memory leak for a process has occurred, the processor 120 may perform operation 903 to operation 905, and when no memory leak for a process has occurred, the processor 120 may re-perform operation 401 of FIG. 4.

According to various embodiments, when a memory leak for a process has occurred, the processor 120 may transmit information on the process in which the memory leak has occurred, to an external electronic device (e.g., the server 108) via a communication module (e.g., the communication module 190 of FIG. 1), in operation 903. For example, the processor 120 may transmit information on at least one of the numbers (n values) of sections divided to identify at least one among a characteristic (e.g., a first characteristic or a second characteristic) of the process in which the memory leak has occurred, memory usage information, a memory usage information collection period, a reference slope, and a change pattern of the memory usage amount, to an external electronic device via the communication module 190. According to various embodiments, the external electronic device may identify that a memory leak has occurred, based on information received from the electronic device. Therefore, an application developer may recognize a memory leak problem of an application, although a memory heap dump is not directly acquired from an electronic device in which a memory leak has occurred.

According to various embodiments, in operation 905, the processor 120 may terminate a process in which a memory leak has occurred. For example, the processor 120 may automatically terminate at least one process in which a memory leak has occurred from among multiple processes executed on the operating system 142 or 310.

In the above description, it is described that the electronic device 101 performs operation 903 of transmitting, to an external electronic device, information on a process in which a memory leak occurs, and then performs operation 905 of terminating the process in which the memory leak occurred. However, according to various embodiments, the electronic device 101 may perform operation 905 of terminating the process in which a memory leak has occurred, concurrently or before performing operation 903 of transmitting information of process to the external electronic device.

According to various embodiments, as the process, in which a memory leak has occurred, is automatically terminated, the electronic device 101 may further efficiently use a memory (e.g., the memory 130 of FIG. 1) space of the electronic device.

Figure 10:
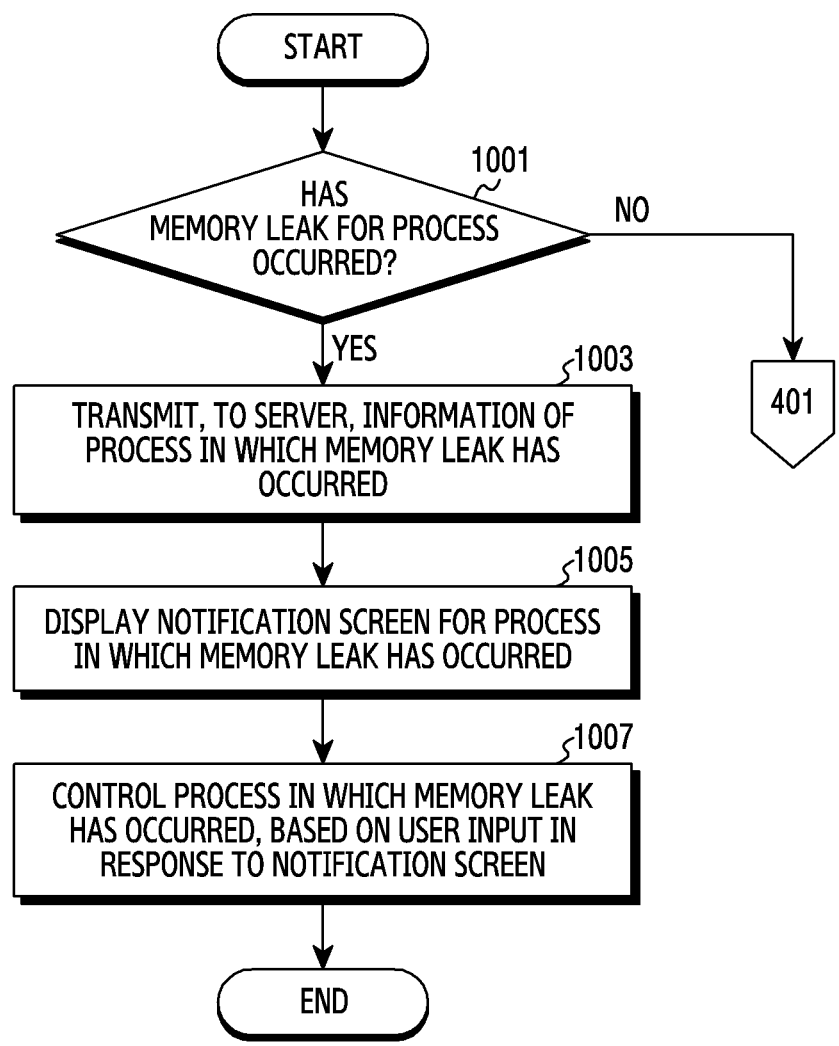
FIG. 10 is a flowchart illustrating another example method for controlling a process in which a memory leak has occurred in the electronic device according to various embodiments.
Figure 11:
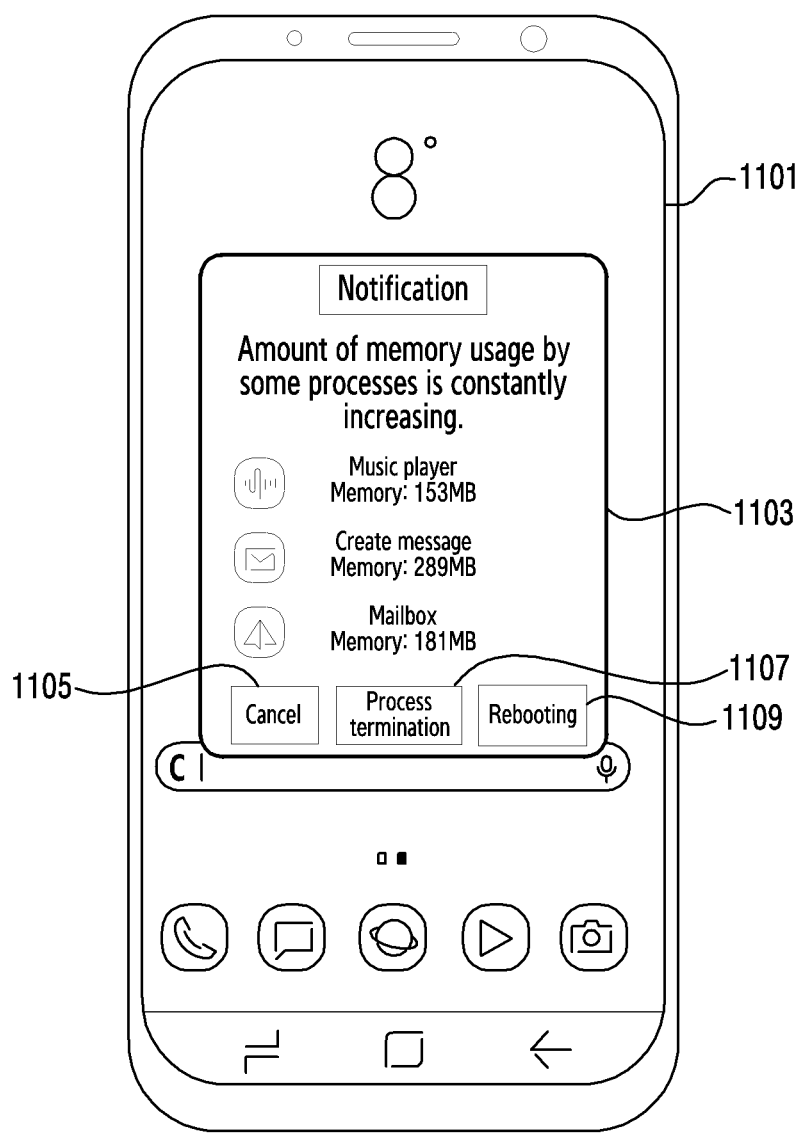
FIG. 11 is a diagram illustrating an example notification screen for a program in which a memory leak has occurred in an electronic device according to various embodiments.

FIG. 10 is a flowchart illustrating another example of a method for controlling a process in which a memory leak has occurred in the electronic device according to various embodiments. FIG. 11 is a diagram illustrating an example notification screen for a program in which a memory leak has occurred in an electronic device according to various embodiments. The following description may be an operation performed after operation 405 of FIG. 4 is performed.

Referring to FIG. 10 and FIG. 11, in operation 1001 according to various embodiments, a processor (e.g., the processor 120 of FIG. 1) of an electronic device (e.g., the electronic device 101 of FIG. 1) may determine whether a memory leak for a process occurs. For example, the processor 120 may determine whether a memory leak for a process occurs, by performing operations of operations 401 to 405 of FIG. 4 with respect to each of multiple processes executed on an operating system (e.g., the operating system 142 of FIG. 1 or the operating system 310 of FIG. 3) of the electronic device. When a memory leak for a process has occurred, the processor 120 may perform operation 1003, 1005 and operation 1007, and when no memory leak for a process has occurred, the processor 120 may re-perform operation 401.

According to various embodiments, in operation 1003, the processor 120 may transmit, to an external electronic device (e.g., the server 108), information on the process in which a memory leak has occurred, via a communication module (e.g., the communication module 190 of FIG. 1). For example, the processor 120 may transmit information on at least one of the numbers (n values) of sections divided to identify at least one among a characteristic (e.g., a first characteristic or a second characteristic) of the process in which the memory leak has occurred, memory usage information, a memory usage information collection period, a reference slope, and a change pattern of the memory usage amount, to an external electronic device via the communication module 190. According to various embodiments, the external electronic device may identify that a memory leak has occurred, based on information received from the electronic device. Accordingly, an application developer may recognize a memory leak problem of an application, although a memory heap dump is not directly acquired from an electronic device in which a memory leak has occurred.

According to various embodiments, in operation 1005, the processor 120 may display a notification screen for a process in which a memory leak has occurred, via a display (e.g., a display device 160). For example, the processor 120 may display, as shown in FIG. 11, a notification screen 1103 including identification information for a process in which a memory leak has occurred, in a partial area of a display 1101 of the electronic device. The identification information may include at least one of an icon associated with a process in which a memory leak has occurred, a process name (e.g., music player, message creation, and mailbox), or a memory usage amount, so that a user of the electronic device can easily recognize the process.

According to various embodiments, in operation 1007, the processor 120 may control the process in which a memory leak has occurred based on a user input to a notification screen. For example, as shown in FIG. 11, the processor 120 may maintain execution of the process in which a memory leak has occurred, when a user input for a cancellation icon 1105 included in the notification screen 1103 is received. As another example, when a user input for a process termination icon 1107 included in the notification screen 1103 is received, the processor 120 may terminate a process in which a memory leak has occurred. As still another example, when a user input for a rebooting icon 1109 included in the notification screen 1103 is received, the processor 120 may reboot the electronic device. As still another example, when a user input that selects identification information of one process from among identification information of multiple processes included in the notification screen 1103 is received, the processor 120 may terminate only a process corresponding to the identification information selected by the user from among multiple programs in which a memory leak has occurred.

According to various embodiments, the electronic device 101 may provide the user with identification information for the process in which the memory leak has occurred, and when the process, in which the memory leak has occurred, is terminated based on a user input, a memory (e.g., the memory 130 of FIG. 1) space of the electronic device 101 may be used more efficiently.

According to various embodiments, a method for detecting a memory leak in an electronic device (e.g., the electronic device 101 of FIG. 1) may include: acquiring usage information for the memory of a process based at least partially on a characteristic of a process executed by a processor (e.g., the processor 120 of FIG. 1) of the electronic device; identifying a change pattern of a usage amount for the memory of the process based on the usage information; and determining whether a memory leak occurs based on the change pattern of the user amount.

According to various embodiments, an operation of acquiring the memory usage information on the process may include an operation of, based on a characteristic of the process being a first characteristic, acquiring first usage information (first memory usage information) for the memory of the process based on a first period, and acquiring second usage information (second memory usage information) for the memory of the process based on a second period.

According to various embodiments, the operation of acquiring the usage information may include an operation of, based on the characteristic of the process being a second characteristic, acquiring third usage information (third memory usage information) for the memory of the process based on a third period, and acquiring fourth usage information (fourth memory usage information) for the memory of the process based on a fourth period.

According to various embodiments, an operation of identifying a change pattern of the usage amount may include an operation of determining whether as many pieces of the usage information as a reference number are acquired; and based on as many pieces of the usage information as a reference number being acquired, identifying a change pattern of the usage amount using a linear regression algorithm.

According to various embodiments, the operation of determining whether a memory leak has occurred may include an operation of determining whether the change pattern of the usage amount exceeds a reference value; and based on the change pattern of the usage amount exceeding the reference value, detecting that a memory leak of the process occurs.

According to various embodiments, an operation of changing the reference value based on an input and/or a signal received from an external electronic device may be further included.

According to various embodiments, based on the memory leak occurring, an operation of transmitting information on the process to an external electronic device may be further included.

According to various embodiments, an operation of changing the collection period based on an input and/or a signal received from the external electronic device may be further included.

According to various embodiments, based on the memory leak occurring, an operation of terminating the process may further be included.

According to various embodiments, based on the memory leak occurring, an operation of displaying a notification screen for the process and an operation of controlling the process based on an input in response to the notification screen may be further included.

The electronic device according to various embodiments disclosed herein may be various types of devices. The electronic devices may include, for example, and without limitation, a portable communication device (e.g., a smart phone), a computer device, a portable multimedia device, a portable medical device, a camera, a wearable device, a home appliance, or the like. The electronic device according to an example embodiment of the disclosure is not limited to the above described devices.

The various embodiments and the terms used herein are not intended to limit the technical features disclosed herein to specific embodiments, and should be understood as including various modifications, equivalents, and/or alternatives to the corresponding embodiments. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st", "2nd", "first", or "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", or "connected with", the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. According to an embodiment, for example, the module may be implemented in the form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the invoked at least one instruction. The one or more instructions may include a code generated by a complier or a code executable by an interpreter. The machine-readable storage media may be provided in the form of non-transitory storage media. Wherein, the non-transitory storage medium is a tangible device, but this term does not differentiate between where data is semi-permanently stored in the storage medium and where the data is temporarily stored in the storage medium.

According to an example embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or directly between two user devices (e.g., smart phones). If distributed online, at least part of the computer program product may be temporarily generated or at least temporarily stored in the machine-readable storage medium, such as the memory of the manufacturer's server, a server of the application store, or a relay server.

According to various embodiments, each component (e.g., a module or a program) of the above-described components may include a single entity or multiple entities. According to various embodiments, one or more components among the above-described components or operations may be omitted, or one or more other components or operations may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. One of ordinary skill in the art will understand that various changes in form and details may be made without departing from the true spirit and full scope of the disclosure.

What is claimed is:

1. An electronic device comprising:
a processor; and
a memory operatively connected to the processor, wherein the memory stores instructions which, when executed by the processor, control the electronic device to:
acquire usage information for the memory of a process executed by the processor based on a collection period including a plurality of sections determined based at least in part on a characteristic of the process;
identify, for each of the plurality of sections in the collection period, a change pattern of a usage amount represented by a linear function for the memory of the process based on the usage information using a linear regression algorithm;
determine whether a memory leak occurs based on comparing a slope of each of the linear functions to a reference value associated with the process; and
terminate the process based on at least the memory leak occurring.

2. The electronic device of claim 1, wherein the instructions, when executed by the processor, control the electronic device to:
acquire first usage information for the memory of the process based on a first period based on the characteristic of the process being a first characteristic; and
acquire second usage information for the memory of the process based on a second period.

3. The electronic device of claim 1, wherein the instructions, when executed by the processor, control the electronic device to:
acquire third usage information for the memory of the processor based on a third period based on the characteristic of the process being a second characteristic; and acquire fourth usage information for the memory of the process based on a fourth period.

4. The electronic device of claim 1, wherein the instructions, when executed by the processor, control the electronic device to:
   determine whether as many pieces of the usage information as a reference number are acquired; and
   identify the change pattern of the usage amount using the linear regression algorithm based on as many pieces of the usage information as the reference number being acquired.

5. The electronic device of claim 1, wherein the instructions, when executed by the processor, control the electronic device to:
   determine whether a slope of each of the linear functions exceeds the reference value; and
   detect that a memory leak of the process has occurred based on the slopes of multiple linear functions exceeding the reference value.

6. The electronic device of claim 5, wherein the electronic device further comprises a communication circuit, and the instructions, when executed by the processor, control the electronic device to change the reference value based on an input and/or a signal received from an external electronic device via the communication circuit.

7. The electronic device of claim 1, wherein the electronic device further comprises a communication circuit, and the instructions, when executed by the processor, control the electronic device to, transmit information on the process to an external electronic device via the communication circuit based on the memory leak occurring.

8. The electronic device of claim 7, wherein the instructions, when executed by the processor, control the electronic device to change the collection period based on an input and/or a signal received from the external electronic device via the communication circuit.

9. The electronic device of claim 1, wherein the electronic device further comprises a display, and the instructions, when executed by the processor, control the electronic device to:
   display a notification screen for the process via the display based on the memory leak occurring; and
   control the process based on an input in response to the notification screen.

10. A computer implemented method for detecting a memory leak in an electronic device, the method comprising:
   acquiring, by a processor of the electronic device, usage information for a memory of a process based on a collection period including a plurality of sections determined based at least in part on a characteristic of the process executed by the processor of the electronic device;
   identifying, by the processor for each of the plurality of sections in the collection period, a change pattern of a usage amount represented by a linear function for the memory of the process based on the usage information using a linear regression algorithm; and
   determining, by the processor, whether a memory leak occurs based on comparing a slope of each of the linear functions to a reference value associated with the process; and
   terminating, by the processor, the process based on at least the memory leak occurring.

11. The method of claim 10, wherein acquiring of the usage information for the memory of the process comprises:
   acquiring, by the processor, first usage information for the memory of the process based on a first period based on the characteristic of the process being a first characteristic; and
   acquiring, by the processor, second usage information for the memory of the process based on a second period.

12. The method of claim 10, wherein acquiring of the usage information comprises:
   acquiring, by the processor, third usage information for the memory of the processor based on a third period based on the characteristic of the process being a second characteristic; and
   acquiring, by the processor, fourth usage information for the memory of the process based on a fourth period.

13. The method of claim 10, wherein identifying of the change pattern of the usage amount comprises:
   determining, by the processor, whether as many pieces of the usage information as a reference number are acquired; and
   identifying, by the processor, the change pattern of the usage amount using the linear regression algorithm based on as many pieces of the usage information as the reference number being acquired.

14. The method of claim 10, wherein the determining whether the memory leak occurs comprises:
   determining, by the processor, whether a slope of each of the linear functions exceeds the reference value; and
   detecting, by the processor, that a memory leak of the process has occurred based on the slopes of multiple linear functions exceeding the reference value.

15. The method of claim 14, further comprising changing, by the processor, the reference value based on input and/or a signal received from an external electronic device via a communication circuit of the electronic device.

16. The method of claim 10, further comprising transmitting, by a communication circuit of the electronic device, information on the process to an external electronic device based on the memory leak occurring.

17. The method of claim 16, further comprising changing, by the processor, the collection period based on an input and/or a signal received from the external electronic device via the communication circuit.

18. The method of claim 10, further comprising:
   displaying, by a display of the electronic device, a notification screen for the process based on the memory leak occurring; and
   controlling, by the processor, the process based on an input in response to the notification screen.

* * * * *